United States Patent [19]
Bloomer

[11] Patent Number: 6,067,953
[45] Date of Patent: May 30, 2000

[54] INTEGRATED INTAKE MANIFOLD AND AIR CLEANER SYSTEM

[75] Inventor: Stephen F. Bloomer, Lambeth, Canada

[73] Assignee: Siemens Canada Limited, Ontario, Canada

[21] Appl. No.: 09/335,606

[22] Filed: Jun. 18, 1999

Related U.S. Application Data

[62] Division of application No. 09/013,523, Jan. 26, 1998.
[60] Provisional application No. 60/057,682, Aug. 27, 1997.

[51] Int. Cl.⁷ .................................................. F02M 31/20
[52] U.S. Cl. .............................. 123/198 E; 123/184.53; 123/184.61; 123/184.21; 29/888.01; 29/890.08
[58] Field of Search ........................... 29/888.01, 890.08; 123/184.21, 184.24, 184.34, 184.42, 184.47, 184.61, 198 E, 184.53, 184.57

[56] References Cited

U.S. PATENT DOCUMENTS

| | | |
|---|---|---|
| 4,790,864 | 12/1988 | Kostun . |
| 5,259,356 | 11/1993 | Karlsson et al. ........................ 123/541 |
| 5,394,850 | 3/1995 | Murphy et al. . |
| 5,477,819 | 12/1995 | Kopec . |
| 5,575,247 | 11/1996 | Nakayama et al. ................. 123/184.21 |
| 5,664,533 | 9/1997 | Nakayama et al. ................. 123/184.42 |
| 5,713,323 | 2/1998 | Walsh et al. ........................ 123/184.42 |
| 5,826,553 | 10/1998 | Nakayama et al. ................. 123/184.42 |

*Primary Examiner*—Noah P. Kamen
*Assistant Examiner*—Hai Huynh

[57] ABSTRACT

An integrated intake manifold and air cleaner system is provided by a molded plastic induction module including molded lower and upper manifold pieces welded together. A series of upright walls on the upper manifold and a cover piece form a box-like enclosure in which an air cleaner element is disposed mounted to a throttle body on the upper manifold piece. A fuel rail and injector are also disposed within the enclosed space. Other components such as the ECU can optionally be mounted within the enclosed space. Resonator and expansion chambers are also defined within the enclosed space.

9 Claims, 5 Drawing Sheets

INTEGRATED INTAKE MANIFOLD AND AIR CLEANER SYSTEM

This application claims the benefit of U.S. Provisional Patent Application No. 60/057,682, filed Aug. 27, 1997 and is a division of patent application Ser. No. 09/013,523, filed Jan. 26, 1998.

BACKGROUND OF THE INVENTION

This invention concerns internal combustion engines of a type used in automotive vehicles and more particularly the air induction and fuel system components. Recent trends in automotive engine design have included the increasing use of molded plastic parts such as intake manifolds and fuel and air induction system components in order to lower costs and reduce engine weight.

Integration of some of these components has also been proposed to reduce costs.

See as examples, U.S. Pat. No. 4,790,864 describing an air cleaner with integrated noise attenuating components; U.S. Pat. No. 5,477,819 describing an air cleaner housing integrating fuel/air induction system components; and, U.S. Pat. No. 5,394,850 describing integrated intake manifold and fuel system components.

U.S. Pat. No. 5,865,863, issued Feb. 2, 1999, attorney docket No. 97 P 7661 US, describes an integrated air cleaner-resonator assembly using a radially sealed cylindrical air filter disposed within a molded plastic air cleaner housing which also defines resonator and expansion chambers.

U.S. Pat. No. 5,771,863, issued on Jun. 30, 1998, attorney docket No. 96 P 7679 US, describes an integrated intake manifold and fuel rail with a method for assembling fuel injectors into the seats in the fuel rail and intake manifold.

It is an object of the present invention to provide further integrated engine air induction and fuel system components in a molded plastic construction, which also further reduces weight, complexity, and costs from designs heretofore proposed, while also providing additional functional advantages for these systems.

SUMMARY OF THE INVENTION

This object and others which will be understood upon a reading of the following specification and claims are achieved by integrating an air cleaner housing-resonator structure with the intake manifold. This is accomplished by a three-piece construction, in which two separately molded upper and lower manifold pieces are respectively formed with portions of the plenum and runners of the intake manifold. The lower piece is also formed with side well chambers on either side of the plenum portion, which side wells are aligned with openings in the upper manifold piece to open into an expansion chamber space defined in the upper piece. The upper manifold piece is also formed with a throttle body mounting base or, alternatively, the throttle body itself.

The upper and lower manifold pieces are welded together along abutting seam edges to seal the various air flow passages and form a unitary member. The upper manifold piece also is formed with upstanding perimeter walls have upper edges engaged with walls of a molded plastic cover piece retained thereon with integral snap fittings, the cover piece and manifold walls together defining a box-like enclosed space.

A fuel rail is disposed within the enclosed space, either formed integrally with the upper manifold piece perimeter walls or separately installed. The upper manifold piece also is formed with seats for fuel injectors, which injectors are installed between the fuel rail and seats.

The fuel rail and injectors are both protected and cooled by being disposed within the cover piece, since the inducted air flow in being drawn into the engine cools the fuel rail and injectors.

The cover piece also has a downwardly projecting partition wall with a lower edge configured to be interfit with the upper manifold piece contour when the cover piece is installed, subdividing the enclosed space into two compartments. An air intake tube is mounted to the cover piece and extends into a first compartment within the cover piece, terminating on one side of an opening through the partition with a gap therebetween, the first compartment thereby caused to function as a resonator chamber.

A tubular air cleaner is disposed within the second compartment space on the other side of the partition, sealed at one end to the throttle body and having the other end located into a ring feature molded into the inside of the cover piece top wall.

Additional integral attachment and other connect features may be molded into the cover piece and manifold upright walls, such as PCV fittings, brake booster fittings, throttle cable openings, etc. Additional components may be mounted within the enclosed space for protection such as the ECU, flow sensors, etc. A manifold flange having a coolant inlet for supplying coolant flow is also molded in the upper manifold piece.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
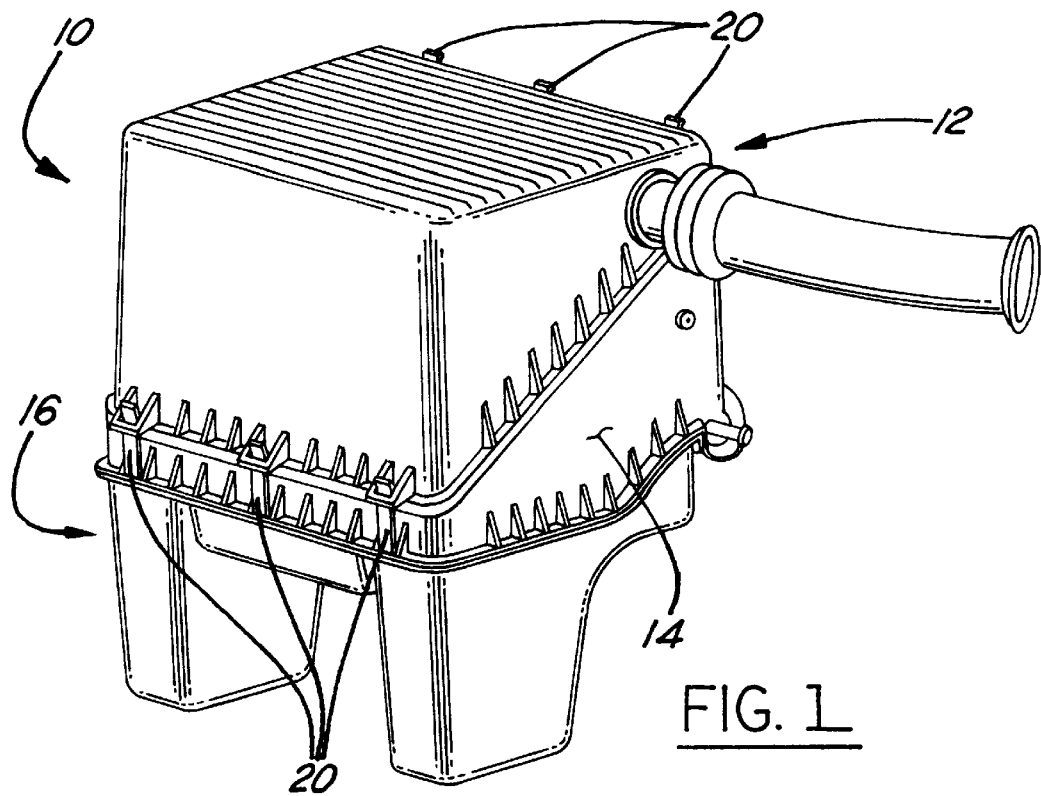
FIG. 1 is a front perspective view of an intake manifold-air cleaner system induction module according to the present invention.
Figure 2:
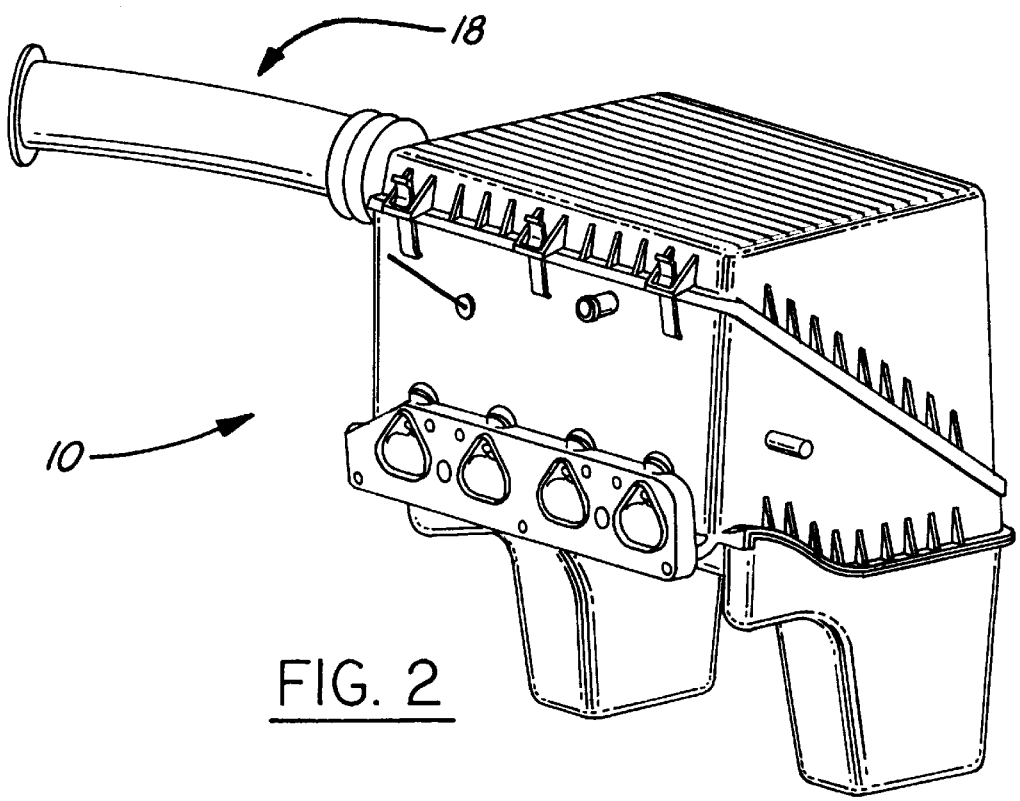
FIG. 2 is a rear perspective view of the integrated intake manifold-air cleaner system induction module shown in FIG. 1.

Referring to the drawings, FIGS. 1 and 2 show an induction module 10 according to the present invention comprised of an integrated intake manifold and air cleaner system. The induction module 10 includes a detachable cover piece 12 secured with a series of spring clip attachments 20 to an upper manifold piece 14. The upper manifold piece 14 is permanently welded to a lower manifold piece 16 to form a single unitary member.

Each of the cover piece 12, upper manifold piece 14, and lower manifold piece 16 have a generally rectangular perimeter and are stacked to form a generally rectangular box-like structure.

An air intake tube 18 is secured in a hole 22 in one wall of the cover piece 12 to direct inducted air into the interior of the cover piece 12.

Figure 4:
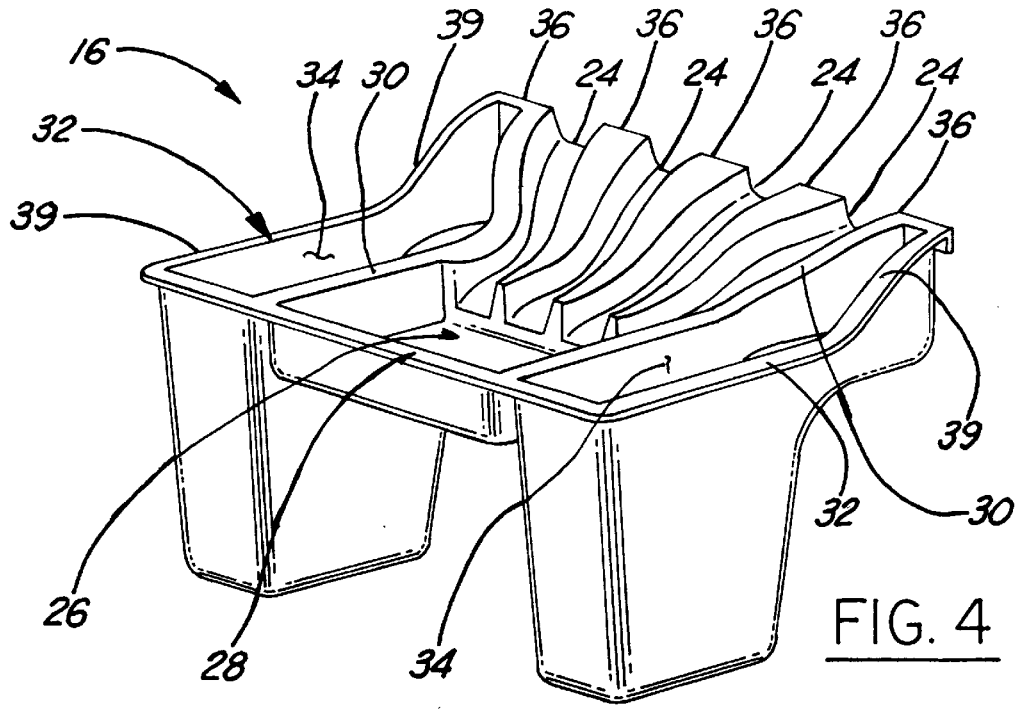
FIG. 4 is a perspective view of the lower manifold piece.

As best seen in FIG. 4, the molded plastic lower manifold piece 16 includes a central region formed with a series of channels 24, defining one half of the manifold runners, channels 24 extending to one side of the piece 16, and also at their other ends converging into a rectangular central plenum space 26 adjacent the opposite side of the lower manifold piece 16.

The plenum space 26 is defined on one side by an outer perimeter edge 28 and by a pair of upstanding interior partitions 30. The space between the partitions 30 and respective piece sidewalls 32 define open-topped side wells 34 which extend downwardly on each side of the central plenum space 26.

A flange 39 extends along the upper edge of each of sides 28, 32 for welding to corresponding edges on the upper manifold piece 14.

Partitions 36 defining the channels 24 have sufficient width to serve this same purpose.

Figure 5:
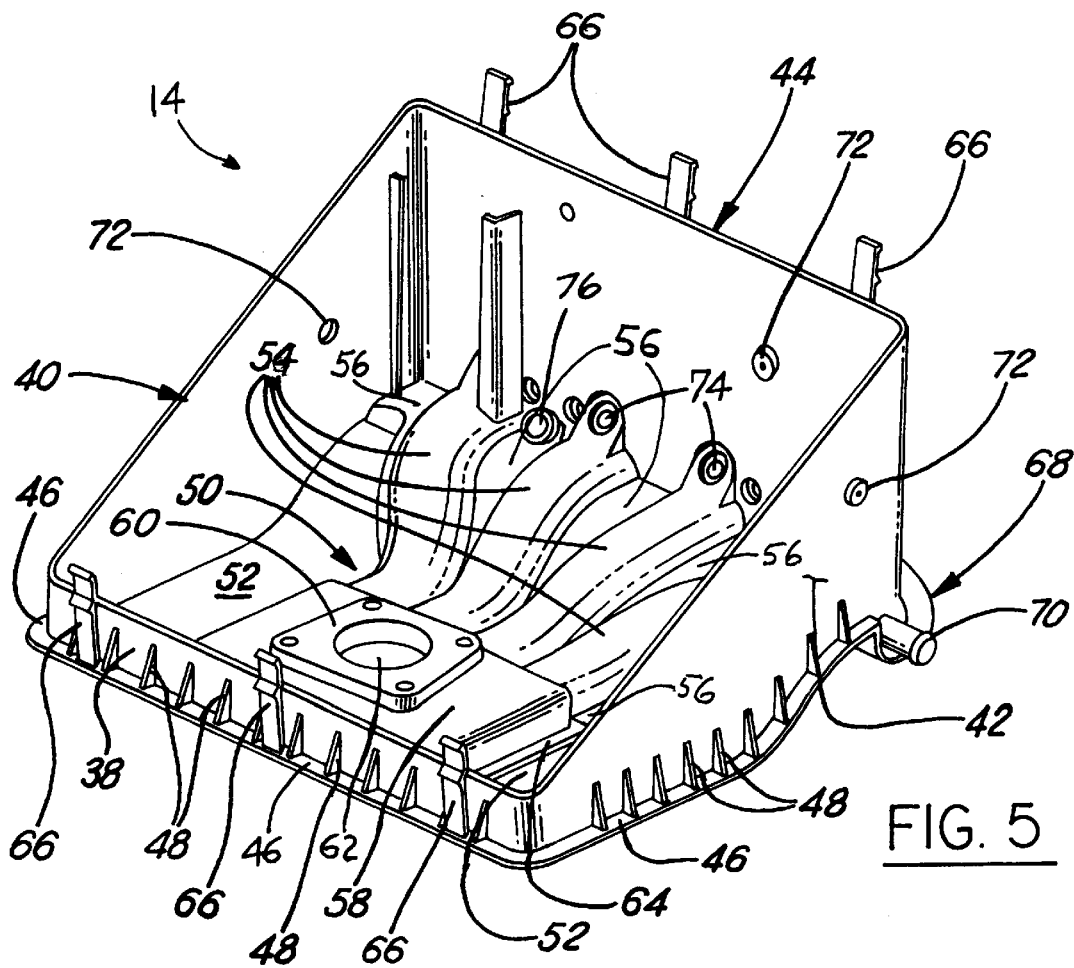
FIG. 5 is a perspective view of the upper manifold piece.

Referring to FIG. 5, the molded plastic upper manifold piece 14 is generally rectangular and has four upright walls, a short height front wall 38, two angled sidewalls 40, 42, and a relatively tall rear wall 44. A flange 46 extends around the lower edge of the front and sidewalls 38, 40, 42 matched to the flange 39 of the lower manifold piece 16.

Stiffener ribs 48 extend from the flange 46 to the front and rear sides 38, 40, 42.

An upper runner-plenum portion 50 extends between the front and rear walls 38, 44, with an open space 52 between each sidewall 40, 42 to be aligned with side wells 34 of the lower manifold piece 16.

The runner-plenum upper portion comprises a series of inverted channels 54 and flanges 56 complementary to the channels 24 and surfaces 36 of the lower manifold piece 16. The inverted channels converge into a plenum cover 58 configured to overlie and match the plenum space 26 of the lower manifold piece 16. A throttle body mounting base 60 with an air inlet opening 62 is molded into the plenum 26, cover 58, and flanges 64 are matched to surfaces 30 of the lower manifold piece 16.

Integral spring fingers 66 project upwardly from the top of the front and rear walls 38, 44.

An integral vertical mounting flange 68 extends across the bottom of the rear wall 44, with a coolant inlet nipple 70 also included.

Various opening features 72 can be included for installation of separately formed items, such as a fuel rail, PCV hose, etc., and/or to accommodate such items as a throttle cable grommet, wiring for an ECU where installed within the cover piece 12, etc.

Also included are fuel injector seats 74 at the top of each inverted channel 54. Exhaust gas recirculation ports 76 can also be included.

The upper and lower manifold pieces 14, 16 are welded together, as by laser or vibration welding to fuse the flanges 46, 56, 32, 36 and create a unitary member with sealed manifold runners and plenum space.

Figure 7:
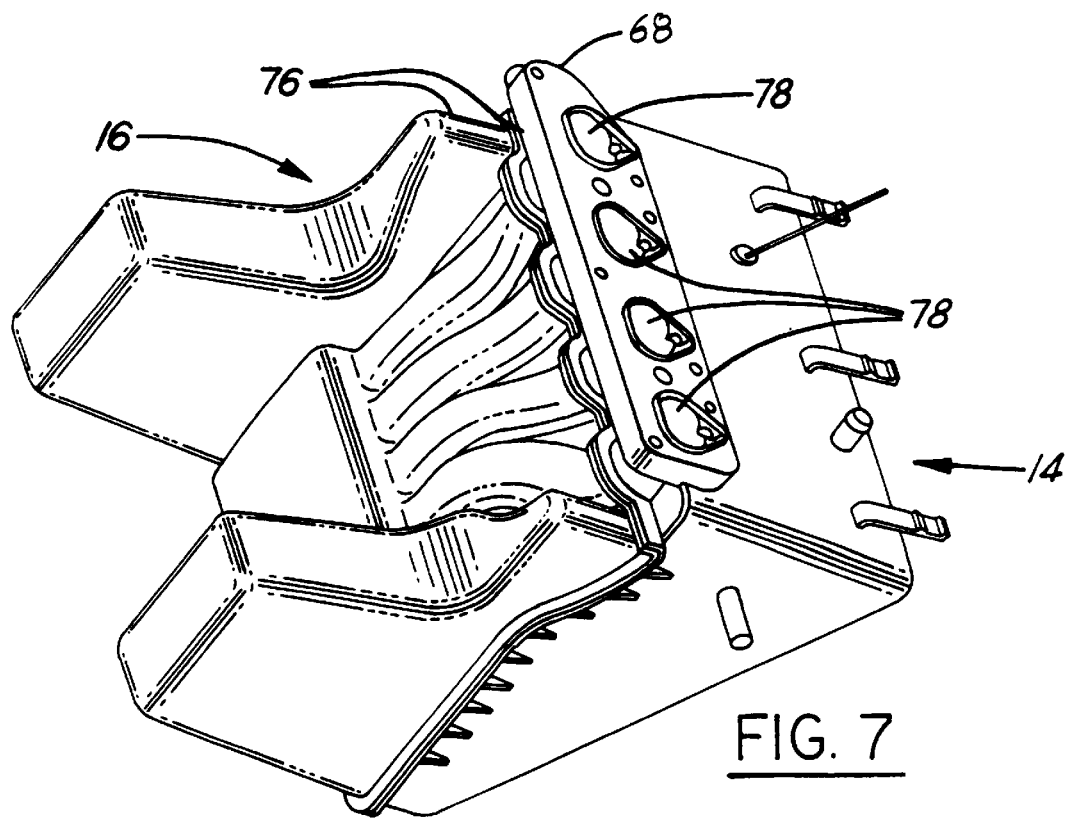
FIG. 7 is a bottom perspective view of the upper and lower manifold pieces.

The mounting flange 68 has a series of intake ports 78 (FIG. 7) into which the runners defined by the fused channels 34, 54 open. Seal grooves are also included extending about each port 78.

Figure 6:
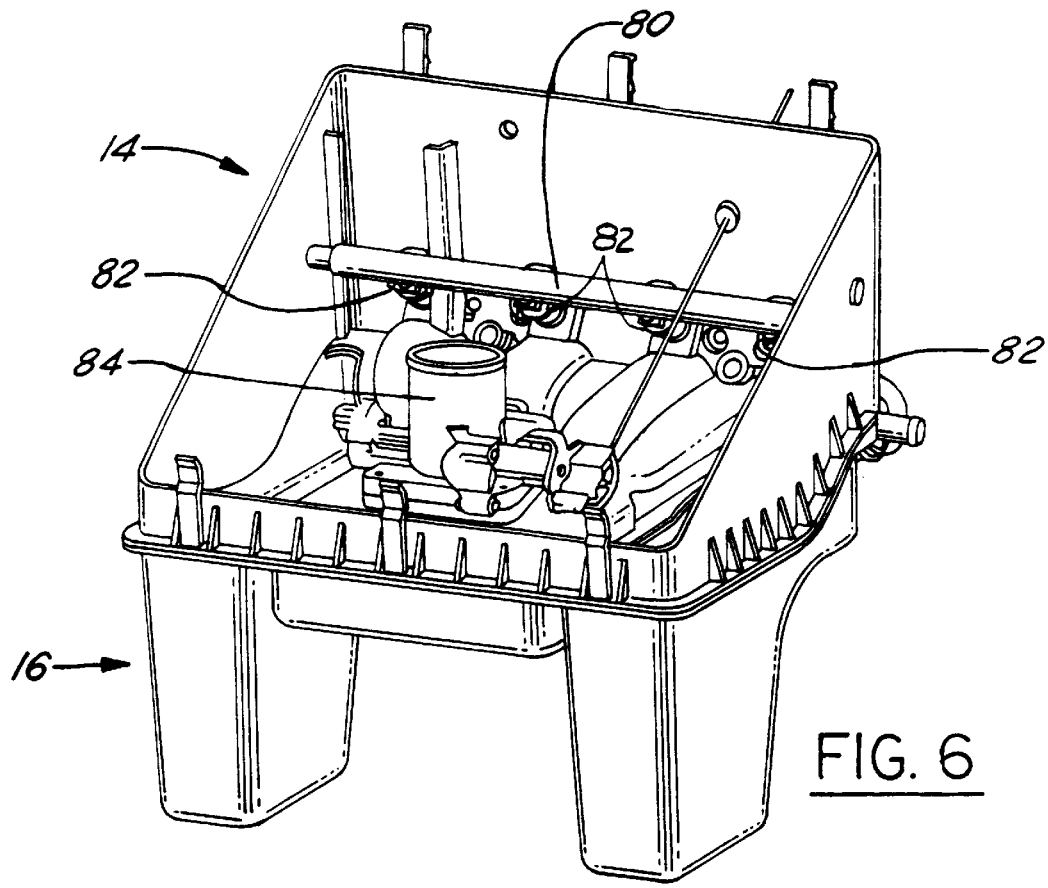
FIG. 6 is a top perspective view of the upper and lower manifold pieces welded together and other componentry assembled therein.

A fuel rail 80 (FIG. 6) can be installed extending between sidewalls 40, 42, together with fuel injectors 82. A separately formed throttle body 84 is installed on the base 60.

The fuel rail 80 and throttle body 84 can also alternatively be integrally molded with the upper manifold piece 14.

Figure 3:
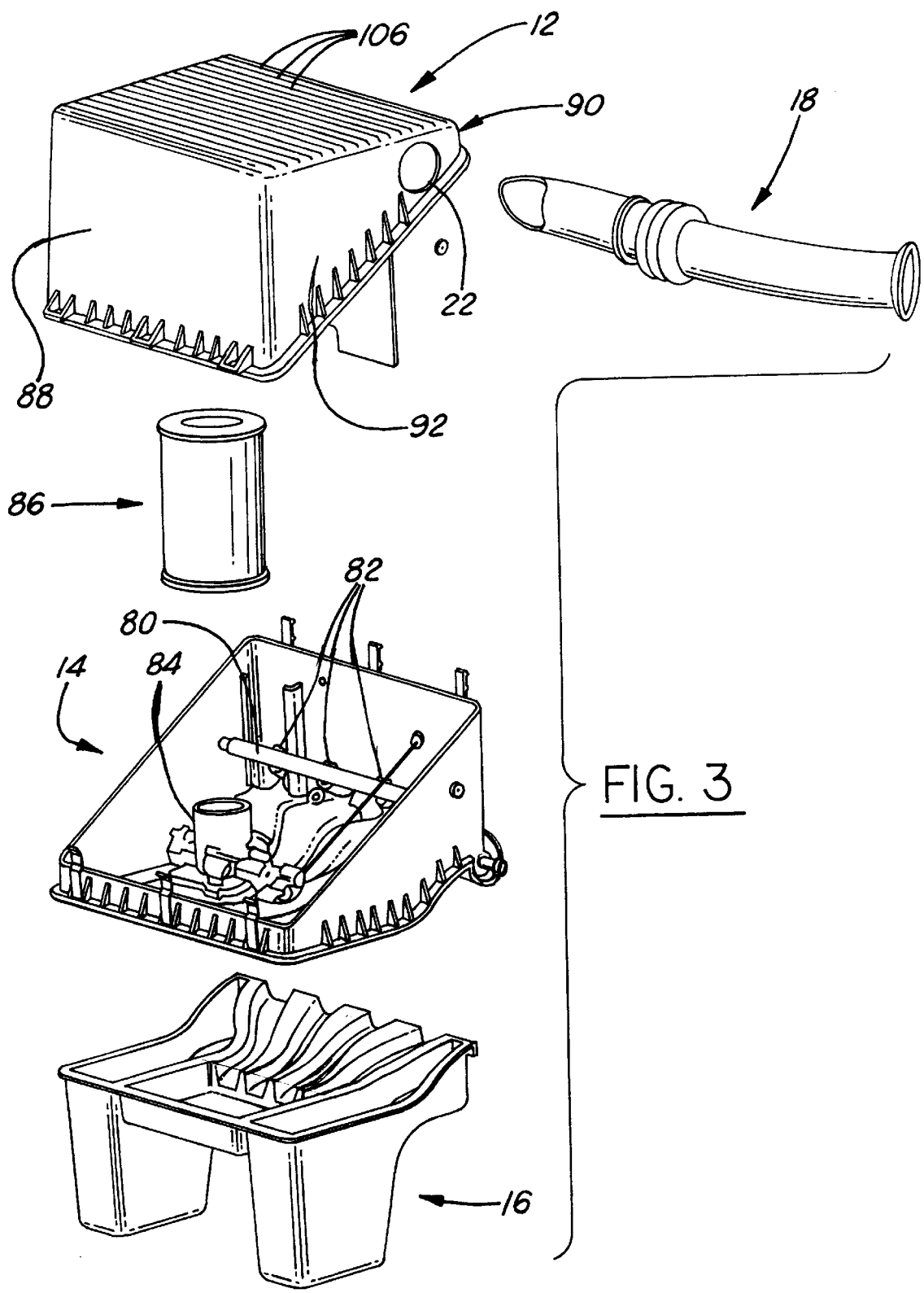
FIG. 3 is an exploded perspective view of the major components of the induction module shown in FIGS. 1 and 2.

A tubular air filter 86 (FIG. 3) is installed onto the throttle body 84 with a sealed connection, the vertically extending filter 86 disposed within the enclosed space defined between the cover piece 12 and upper manifold piece 14.

Figure 8:
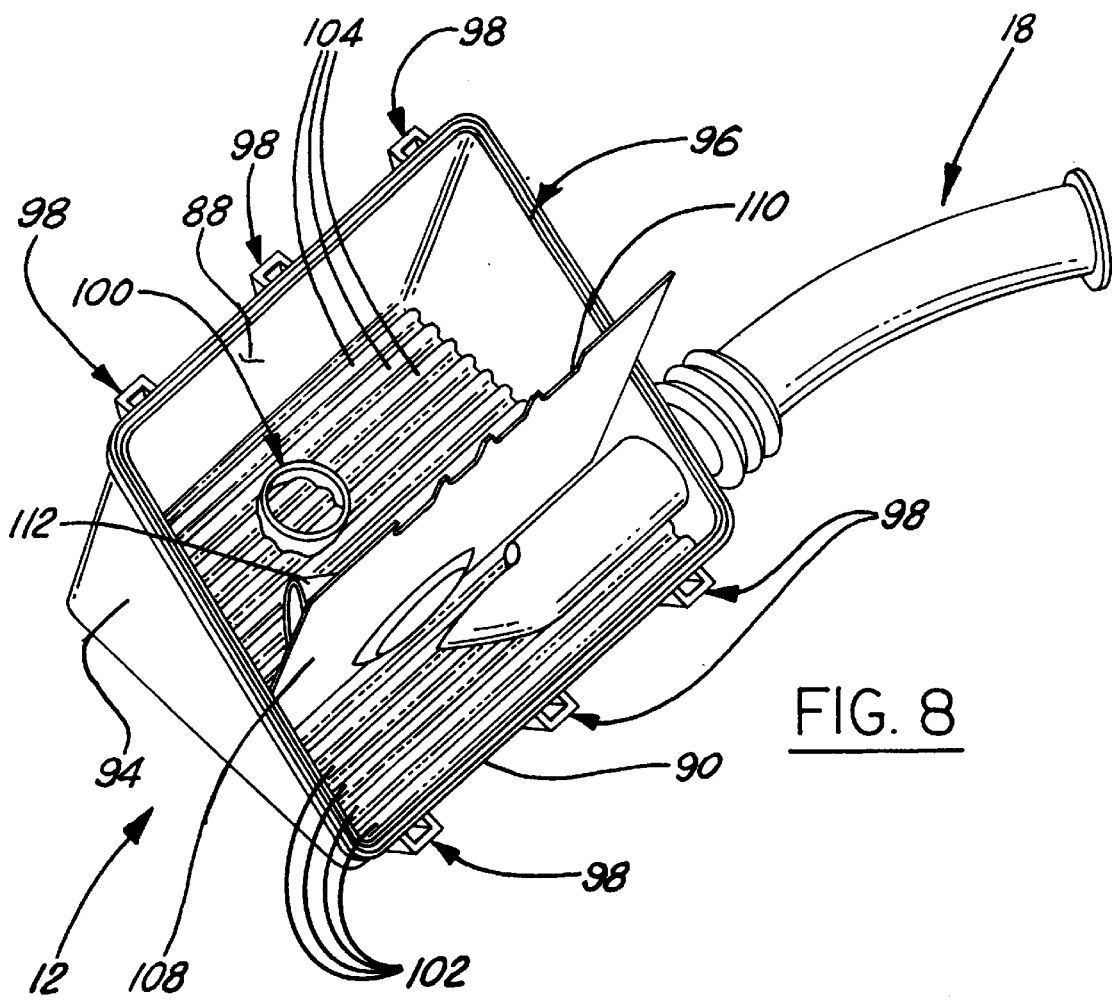
FIG. 8 is a perspective view of the cover piece looking into the inside surface of the top thereof.

The cover piece 12 (FIGS. 3, 8) is substantially rectangular in shape, having a high front wall 88, a short rear wall 90, and a pair of angled sidewalls 92, 94 complementary to the walls 38, 40, 42, 44 so that when the cover piece 12 is fit thereonto, a closed box-like enclosure is formed.

The angled sidewalls 92, 94 are provided so as to allow access to the manifold mounting bolts (not shown) from the sides, the short front wall 38 not blocking access by nut or bolt drivers moved in from the side. Alternatively, equal height walls could be provided to define the enclosed space.

The perimeter formed by the edge 96 of the walls 88, 90, 92, 94 is grooved such as to establish a tongue and groove interfitting of the upper edges of the upright walls 38, 40, 42, 44 of upper manifold piece 14. A series of sockets 98 on the front and rear walls 88, 90 are located to receive the spring fingers 66 to releasably secure the cover 12 on the upper manifold piece 14. A perfect seal is not required since only unfiltered air flows into the enclosed space.

A locator ring 100 is molded to the inside of the cover piece top wall 102 which has molded stiffener ribs 104, 106 on the inside and outside.

The inlet tube 18 extends into the cover piece to a point adjacent a baffle partition wall 108 having a contoured lower edge 110 configured to fit to the inverted channels 54 and surfaces 56. A short connector tube 112 passes between the two enclosed volumes so formed.

A short gap remains between the inside terminus of the tube 18 and a short connector tube 112. This relationship establishes a resonator chamber defined on the upstream side of the baffle partition 108 which reduces noise in certain frequency ranges as is well known in the art.

The volume of the compartment on the other side of the partition 108 through which the air flow passes, combined with that of the side wells 34, defines an expansion chamber to reduce induction noise in the manner well known in the art.

The resulting largely integrated intake module eliminates many separate components and reduces weight and costs. The air flow path is shortened to reduce flow restrictions, and a separate clean air hose from the filter to the throttle body with necessary connections and leak points is eliminated.

The enclosed space houses critical components to protect the same and eliminate separate mounting hardware, as well as improving the under-hood appearance of a vehicle using the induction module.

The location of the fuel rail in the induction air flow path also provides cooling of the fuel rail and injectors.

While a particular layout of the enclosed space into an expansion chamber and resonator chamber configurations has been described, the enclosed space can be subdivided differently or not subdivided as desired for a particular application.

What is claimed is:

1. A method of making an integrated intake manifold and air cleaner system for an internal combustion engine, comprising the steps of:

forming a molded intake manifold including a plenum and runners;

molding a series of upright walls on said intake manifold, extending about a perimeter thereof;

molding a cover piece configured to be detachably fit to upper edges of said walls to form an enclosed space;

disposing an air induction throttle body within said enclosed space; and, installing an air cleaner element on said throttle body in said enclosed space.

2. The method according to claim 1 further including the step of integrally molding said throttle body with said intake manifold.

3. The method according to claim 1 further including the step of disposing a fuel rail within said enclosed space.

4. The method according to claim 3 further including the step of integrally molding said fuel rail with said upright walls.

5. The method according to claim 1 further including the step of integrally molding a baffle partition integral with the inside of said cover piece so as to extend downwardly into engagement with said intake manifold so as to subdivide said enclosed space into two compartments.

6. The method according to claim 5 further including the step of molding an opening in said partition, placing said two compartments in fluid communication with each other, and installing an air intake tube juxtaposed to said opening with a gap therebetween to cause one compartment to function as a resonator chamber.

7. The method according to claim 1 wherein in said step of forming said molded intake manifold, a lower and an upper manifold piece are molded separately and then welded together along a parting line to form an integral piece.

8. The method according to claim 7 wherein in molding said lower manifold piece, a pair of side wells are molded thereinto one each side of a plenum portion.

9. The method according to claim 1 further including the step of molding snap fit fasteners to said cover piece and upright walls for securing said cover piece to upper edges of said wall.

* * * * *